S. M. PERRY.
VEHICLE WHEEL.
APPLICATION FILED JULY 6, 1920.

1,396,283.

Patented Nov. 8, 1921.

Inventor
S. M. Perry.
By Arthur F. Durand
Atty.

UNITED STATES PATENT OFFICE.

SEARAL M. PERRY, OF ROSELAND, ILLINOIS, ASSIGNOR OF ONE-HALF TO JOHN J. STOLL, OF CHICAGO, ILLINOIS.

VEHICLE-WHEEL.

1,396,283. Specification of Letters Patent. Patented Nov. 8, 1921.

Application filed July 6, 1920. Serial No. 394,064.

*To all whom it may concern:*

Be it known that I, SEARAL M. PERRY, a citizen of the United States of America, and a resident of Roseland, Illinois, have invented a certain new and useful Improvement in Vehicle-Wheels, of which the following is a specification.

This invention relates to resilient vehicle wheels, and more particularly to those in which springs are employed to sustain the loadweight of the vehicle.

Generally stated, the object of the invention is to provide an improved construction and arrangement whereby springs are employed in the spoke structure between the hub and the felly of the wheel, so that the hub may move up and down relatively to the rigid ring which forms the felly thus cushioning the shocks and vibrations incident to the passing of the vehicle wheel over rough roads.

A special object is to provide an improved construction and arrangement whereby some of the springs are inclosed in the spokes, which latter are pivoted on the hub at their inner ends, and on the felly at their outer ends, and whereby some of the springs extend from one spoke to another, thus distributing the weight between as many springs as possible.

It is also an object to provide certain details and features of construction and combinations tending to increase the general efficiency and the desirability of a resilient vehicle wheel of this particular character.

To these and other useful ends the invention consists in matters hereinafter set forth and claimed and shown in the accompanying drawings, in which—

Figure 1:
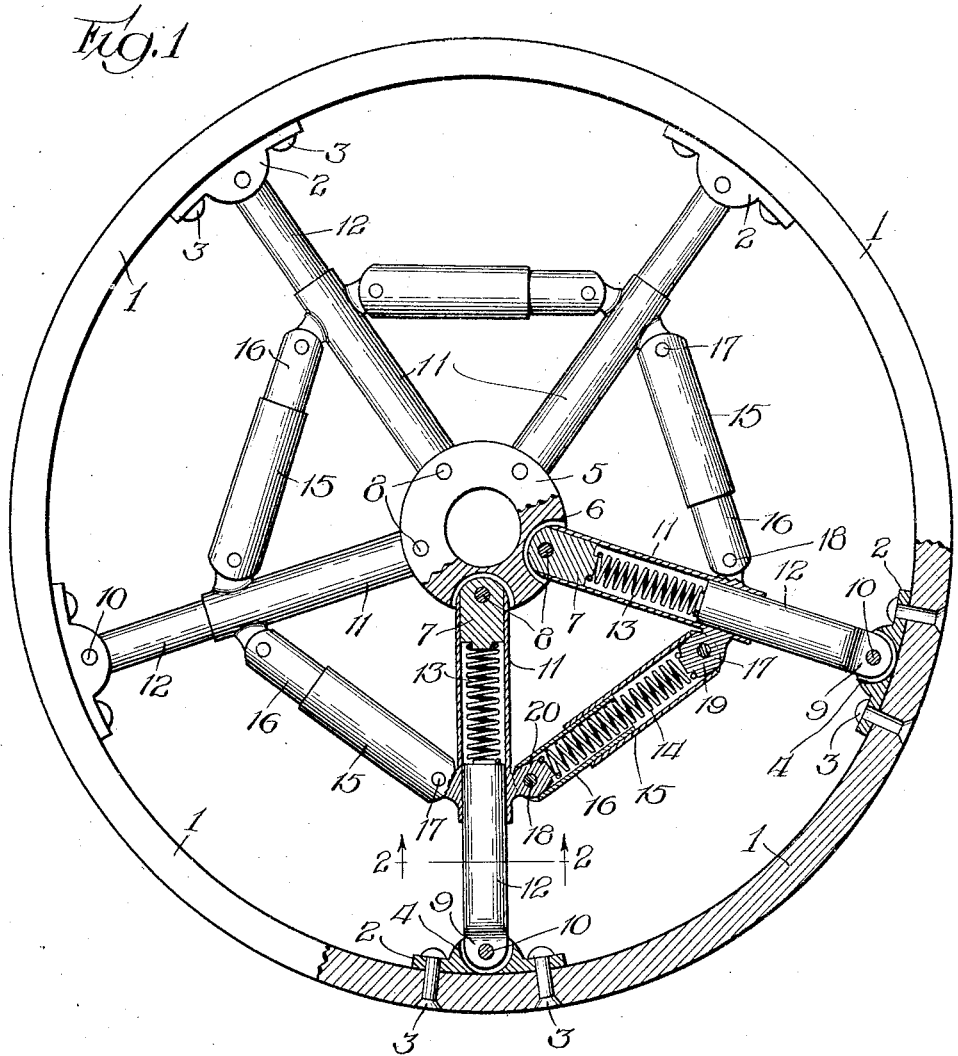
Figure 1 is a side elevation of a vehicle wheel embodying the principles of the invention, showing certain portions thereof in section.
Figure 2:
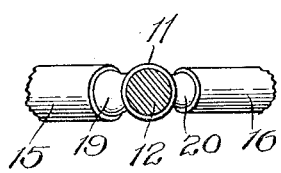
Fig. 2 is a detail section on line 2—2 in Fig. 1.

As thus illustrated, the rigid metal ring 1 forms the felly of the wheel, and is provided at intervals around the inner circumference thereof with brackets 2 which are secured in place by rivets 3 and which are formed with recesses 4 to receive the outer ends of the spokes. The hub 5 is of any suitable character, but is preferably provided with recesses 6 disposed opposite the recesses 4, so that the inner ends of the spokes are also held in recesses, as will hereinafter more fully appear. Each spoke comprises a solid end piece 7 pivoted at 8 in the recess 6, and another end piece 9 pivoted at 10 in the recess 4, a tube 11 being rigidly connected to the end piece 7, and a solid rod 12 being integrally connected with the end piece 9, the said tube being telescoped over the said rod, whereby each spoke is adapted to expand and contract longitudinally. A coil spring 13 is inclosed in the tubular spoke, and has its ends securely fastened to the said elements 7 and 12, so that each spring can act not only as a compression spring, when the spoke is reduced in length under the load weight, but also as a spring which is adapted to sustain the weight by a longitudinal pull exerted thereon when the spokes are above the hub. The springs can be fastened to the said elements 7 and 12 in any suitable or desired manner, and the recesses 4 and 6 serve to brace the spoke structure laterally, so that the felly 1 is held against lateral displacement relatively to the hub. The coil springs 14 are arranged between the spokes, each spring being fastened at its opposite ends to the tubes 11 of two of the spokes, and each spring having a telescoping tubular housing formed by the tubes 15 and 16, which are pivoted at their ends upon the spokes, whereby these springs are inclosed by tubular housings which are adapted to expand and contract longitudinally. The tubes 15 are pivoted on the spokes at 17, while the tubes 16 are pivoted on the spokes at 18, and the springs 14 are securely fastened to the portions 19 and 20 which extends from the spokes, whereby said spokes and all of the springs and telescoping tubes are disposed in the same vertical plane, all of the springs being fully inclosed.

With the wheel thus constructed, the load weight is distributed between the different springs, and the hub is free to move up and down while the wheel is passing over rough ground, thus cushioning the vehicle against shocks and vibrations. The invention, it will be understood, can be used in the construction of either the front wheels or the rear wheels of the automobile or motor vehicle, or in all of the wheels, as may be desired. Also, the invention can be used in the wheels of trailers or other vehicles.

The springs 14 and the tubes inclosing them extend at right angles to the radius of the wheel, it will be seen, so that when the hub moves up and down the telescoping tubes move relatively to each other, and the springs yieldingly oppose the movement and support the loadweight. The spokes are very strong, as the members 12 are solid and move back and forth in strong tubes 11, with a tight sliding fit, so that each spoke is longitudinally adjustable in length, so to speak, being held in normal condition by the springs 13 therein, as well as by said other springs. Each spring sustains both a compression and a tensile strain, and the load weight of the vehicle is, therefore, always imposed on all of the springs.

What I claim as my invention is:—

1. In a wheel, a felly, a hub, telescoping spokes, means to pivot the spokes on the felly, means to pivot the spokes on the hub, and springs fastened at their opposite ends in said spokes, so that each spring sustains both a compression and a tensile strain, and whereby the load weight is always imposed on all of the springs, telescoping connections between said spokes, and springs fastened at their opposite ends to said connections, whereby there is always a spring under compression above said hub and a spring under compression below the hub.

2. A structure as specified in claim 1, each of said spokes comprising a tube, and a rod formed to smoothly fit the bore of said tube, with the spring thereof fastened at one end to the rod, and at the other end to the tube.

3. In a wheel, a felly, a hub, telescoping spokes supporting the hub on the felly, telescoping connections each extending from one spoke to the next, and inclosed springs fastened at their opposite ends in said connections, so that each spring sustains both a compression and a tensile strain, and whereby the load weight is always imposed on all of the springs.

SEARAL M. PERRY.